United States Patent
Büttner et al.

[19]

[11] Patent Number: 5,887,957
[45] Date of Patent: Mar. 30, 1999

[54] CIRCUIT ARRANGEMENT FOR A BRAKE SYSTEM WITH ELECTRONIC BRAKE FORCE DISTRIBUTION CONTROL

[75] Inventors: Hans-Joachim Büttner, Hohenahr; Dieter Burkhard, Waldfischbach-Burgalben; Norbert Ehmer, Eschborn, all of Germany

[73] Assignee: ITT Automotive Europe GmbH, Germany

[21] Appl. No.: 737,656

[22] PCT Filed: Apr. 22, 1995

[86] PCT No.: PCT/EP95/01531

§ 371 Date: Feb. 24, 1997

§ 102(e) Date: Feb. 24, 1997

[87] PCT Pub. No.: WO95/32113

PCT Pub. Date: Nov. 30, 1995

[30] Foreign Application Priority Data

May 21, 1994 [DE] Germany .......................... 44 179 35.9

[51] Int. Cl.$^6$ ................ B60T 8/26; B60T 8/28; B60T 8/30; B60T 8/78

[52] U.S. Cl. ............... 303/186; 188/181 A; 188/181 C; 701/79; 303/178; 303/113.5; 303/189; 303/174

[58] Field of Search ............................ 303/178, 177, 303/186, 187, 188, 113.5, 155, 199, 170, 169, 198, 20, 154, 174, 189; 701/79, 71, 74, 70; 188/181 C, 181 A, 349; 180/197

[56] References Cited

U.S. PATENT DOCUMENTS 4,699,436 10/1987 Klein .
4,826,257 5/1989 Bunckhardt et al. .................. 303/186
5,469,358 11/1995 Ruhnan ................................ 303/178
5,482,361 1/1996 Burckhardt et al. ................ 303/113.5
5,700,074 12/1997 Sugimoto et al. .................... 303/186

FOREIGN PATENT DOCUMENTS

| 2 539 687 | 7/1984 | France . |
| 3 109 372 | 9/1982 | Germany . |
| 3 301 948 | 7/1984 | Germany . |
| 3 306 611 | 8/1984 | Germany . |
| 3 323 402 | 10/1984 | Germany . |
| 3 722 107 | 1/1988 | Germany . |
| 3 728 480 | 1/1989 | Germany . |
| 3 838 536 | 5/1990 | Germany . |
| 4 112 388 | 10/1992 | Germany . |
| 4 128 087 | 2/1993 | Germany . |
| 4 225 080 | 2/1993 | Germany . |
| 4 227 083 | 2/1994 | Germany . |
| 4 337 498 | 5/1994 | Germany . |
| 2 135 413 | 8/1984 | United Kingdom . |

OTHER PUBLICATIONS

Patent Application, labeled P5295, for Method and Device for Controlling the Distribution of Brake Force.

Primary Examiner—Douglas C. Butler
Attorney, Agent, or Firm—Ratner & Prestia

[57] ABSTRACT

A circuit arrangement for a brake system with electronic brake force distribution control includes circuits which determine the deceleration of the rear wheels and the deceleration of a vehicle or a corresponding reference quantity. The discrepancy of the filtered rear-wheel deceleration from the vehicle deceleration is evaluated for brake force distribution control. To this end, an output signal is produced by way of a differentiator and integrator comparing the rear-wheel deceleration and the vehicle deceleration, and the output signal is evaluated for the control of the braking pressure in the rear-wheel brakes.

7 Claims, 3 Drawing Sheets

CIRCUIT ARRANGEMENT FOR A BRAKE SYSTEM WITH ELECTRONIC BRAKE FORCE DISTRIBUTION CONTROL

This application is the U.S. national-phase application of PCT International Application No. PCT/EP95/01531.

BACKGROUND OF THE INVENTION

The present invention relates to a circuit arrangement for a brake system with electronic control of the brake force distribution to the front axle and the rear axle, hereinbelow referred to as EBV, including electrically controllable hydraulic valves inserted in the pressure fluid conduits leading to the rear-wheel brakes and in return conduits, wheel sensors to determine the wheel rotational behavior, and an electronic circuit which evaluates the sensor signals, generates signals to actuate the hydraulic valves and includes circuits which determine the deceleration of the rear wheels and the deceleration of the vehicle or a reference quantity representative of the deceleration of the vehicle in approximation, and which compare these deceleration values.

German patent application No. 33 06 611 (GB-A-2 135 413) discloses a circuit arrangement of this type. This application relates to a method of controlling the brake force distribution which is based on measuring and comparing the brake slip on the front wheels and the rear wheels. The brake slip on the rear wheels is limited to the value of the brake slip on the front wheels or to a somewhat smaller value. The braking pressure on the rear axle is reduced in response to a signal which is indicative of an imminent locked condition of the rear wheels and produced by comparison of the rear-wheel deceleration with the vehicle deceleration.

German patent No. 33 23 402 discloses an anti-lock brake system including electromagnetically operable hydraulic valves which are also used to control the brake force distribution. For this purpose, an inlet valve is inserted into each pressure fluid conduit to the rear-wheel brakes. Actuation of the inlet valve permits controlling the pressure increase in the rear-wheel brakes also in a so-called partial braking operation, i.e., prior to the commencement of anti-lock control. To control or adjust the brake force distribution, an outlet valve can be used to reduce the braking pressure in the rear-wheel brakes. It is preferred to limit the brake slip on the rear wheels to a defined percentage, preferably 85–97% of the brake slip of the front wheels, by actuation of the rear-wheel valves.

A brake system with electronic brake force distribution (EBV) of this type obviates the need for mounting a conventional mechanical or hydraulic braking pressure reducing valve or braking pressure control valve which has previously been used to prevent overbraking of the rear wheels due to a static or dynamic axle load shift. This reduces the expenditure in manufacturing the brake system. In addition, the components which are required in an electronic anti-lock system, in particular the wheel sensors and the hydraulic valves, may also be used for the EBV function.

A shortcoming of these known brake systems with EBV function is that the wheel speed must be measured with great accuracy to determine the actual slip. A defined amount of slip already is involved due to the inevitable differences in the rolling circumferences of the individual wheels. Also, differences in wheel speeds occur during cornering, which the control erroneously interprets as slip. Upon failure of one of the front-wheel brakes, special provisions are required when an EBV function on the basis of the difference between the slip of the front wheel and the rear wheel is performed to prevent the braking pressure in the rear-wheel brakes from being restricted to an insufficient amount of braking pressure.

SUMMARY OF THE INVENTION

An object of the present invention is to overcome the disadvantages of known brake systems with the EBV function as described hereinabove. It has been found that this object can be achieved by a circuit arrangement of the previously mentioned type. According to the special characteristics of the circuit arrangement, the discrepancy of the rear-wheel deceleration from the vehicle deceleration or from the reference quantity representative of the deceleration of the vehicle in approximation is evaluated for the control of brake force distribution.

Thus, the present invention includes an electronic control of the brake force distribution which is virtually independent of the instantaneous wheel slip and, more particularly, of the slip difference front axle/rear axle. The previously necessary high demands on measuring and calculating the wheel speeds are thereby reduced. Upon failure of a front-wheel brake, the measured quantity for the vehicle deceleration or the corresponding reference quantity remains correct, at least in approximation, whereby the EBV function is preserved.

In a preferred aspect of the present invention, the wheel sensor signal representative of the speed of a rear wheel is sent to a low-pass filter by way of a differentiating circuit. The output signal of the low-pass filter is compared with the vehicle deceleration or the reference quantity by a differentiator and integrator. The output signal of the differentiator and integrator is produced according to the relation $$x(t)=\int (b'_R-b_{Fz})dt.$$

In this relation, $b'_R$ is the filtered deceleration signal of the right ($b'_3$) or left ($b'_4$) rear wheel, $b_{FZ}$ is the vehicle deceleration or a reference quantity in approximation of the vehicle deceleration.

The braking pressure in the associated rear-wheel brake is reduced, kept constant or reincreased as a function of the output signal of the differentiator and integrator. The magnitude of the output signal is decisive which is compared with predetermined limit values.

The present invention will be explained in detail hereinbelow, making reference to the accompanying drawings.

DETAILED DESCRIPTION OF THE INVENTION

Figure 1:
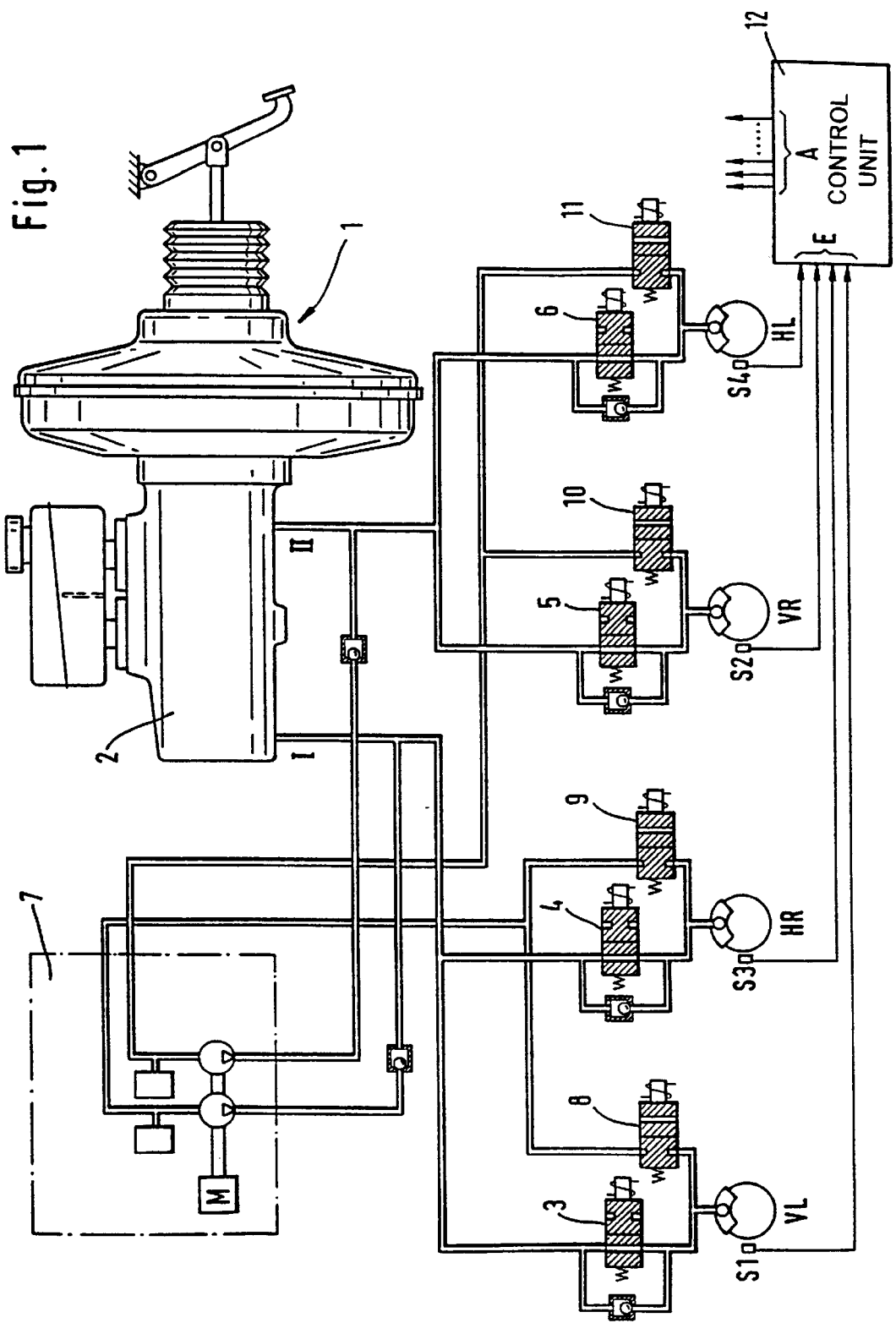
FIG. 1 is a schematically simplified view of the most important components of an embodiment of a brake system with anti-lock control (ABS) and electronic brake force distribution control (EBV).

FIG. 1 serves to explain the principal structure of a brake system with ABS and EBV functions. The wheel brakes of a vehicle in the embodiment shown are connected diagonally to the two hydraulic circuits I, II of a pedal-operated braking pressure generator 1. The front wheels are denoted VL, VR and the rear wheels are denoted HR, HL in FIG. 1. Electrically operable inlet valves 3–6, open in the inactive position, are inserted in each of the pressure fluid conduits leading from the master cylinder 2 of the braking pressure generator 1 to each individual wheel brake. Outlet valves 8–11, which are also operable electrically and closed in the inactive position, are interposed in return conduits which lead from the wheel brakes of the individual wheels to a hydraulic pump system 7. Of course, electronic brake force distribution control is possible also in brake systems having a different allotment of the hydraulic brake circuits.

Only the hydraulic valves 4, 9; 6, 11 associated with the rear-wheel brakes are required for the electronic control of brake force distribution. All inlet valves 3–6 and outlet valves 8–11, respectively, are required for anti-lock control.

Each vehicle wheel is equipped with a wheel sensor S1 to S4. The output signals of the wheel sensors are evaluated in a control unit 12 which includes the electronic circuits for the brake force distribution control and anti-lock control. Also, the signals to control the hydraulic valves 3–6 and 8–11, connected to the outputs A of the control unit 12, are produced in the control unit 12. Reference character "E" designates sensor inputs to the control unit 12.

Figure 2:
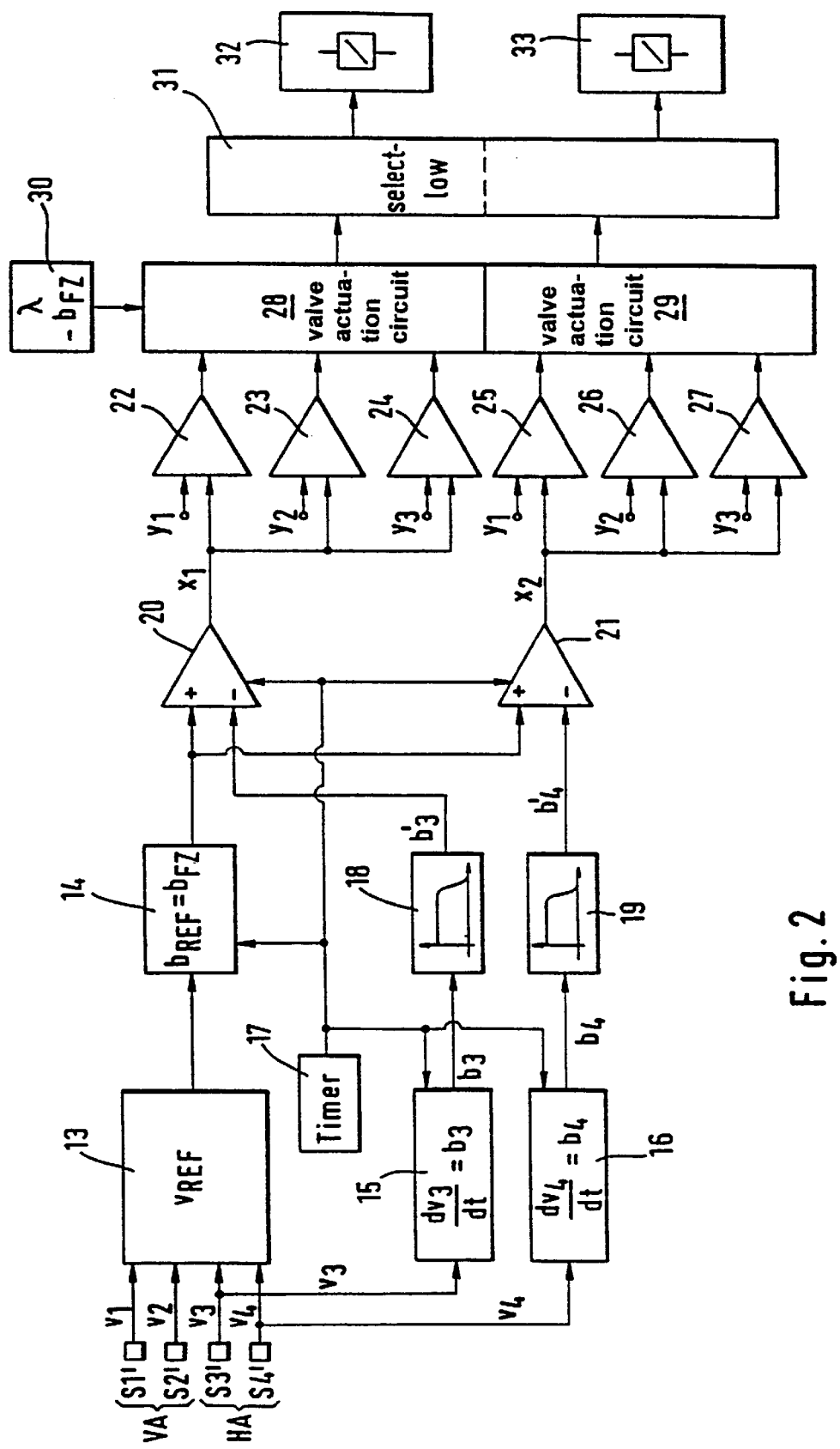
FIG. 2 is a schematically simplified view of an electronic circuit arrangement of the present invention to control the brake force distribution for the brake system in FIG. 1.

The conditioned sensor signals S1 to S4, as input signals S1' to S4', are sent to the circuit of FIG. 2, which is part of the control unit 12 of FIG. 1. The signals S1' and S2' indicate the rotational behavior of the front wheels and the signals S3' and S4' indicate the rotational behavior of the rear wheels. A vehicle reference speed, which represents the vehicle speed in approximation, is produced by logically linking the sensor signals S1' to S4' in a known fashion. The speed $v_1$, $v_2$ of the front wheels VR, VL could also be evaluated as a reference quantity in the EBV mode. The vehicle reference speed is designated as $v_{REF}$ in FIG. 2. $V_{REF}$ is produced in a linking circuit 13. The vehicle reference speed $v_{VREF}$ is differentiated in a circuit 14 to determine the reference quantity $b_{FZ}=b_{REF}$.

The deceleration of the rear wheels is produced similarly by way of differentiating circuits 15 and 16. The working cycle for the differentiating circuits 15 and 16 is furnished by a clock pulse generator or timer 17 in the embodiment shown.

The deceleration signals $b_3$, $b_4$, representative of the rear-wheel deceleration, are respectively sent to a differentiator and integrator means 20, 21 by way of a filter 18, 19, provided as a low-pass filter and used as a deceleration element and for the suppression of interferences. The discrepancy of the deceleration of a rear wheel $b_3$, $b_4$ and $b'_3$, $b'_4$, respectively, from the vehicle deceleration $b_{FZ}$ is determined in each case. The output signals $x_1$ and $x_2$ of the differentiators and integrators 20, 21 are produced according to the relation $$x(t) = \int \left( \frac{dv_R}{dt} - b_{REF} \right) dt = \int (b_R' - b_{REF}) dt$$

In the embodiment shown, $x_1$ refers to the right rear wheel HR, and $x_2$ refers to the left rear wheel HL.

The output signals x(t) and $x_1$, $x_2$ of the differentiators and integrators 20, 21, which constantly determine the difference between the filtered rear-wheel deceleration $b'_3$, $b'_4$ and the vehicle deceleration $b_{REF}$ and add it to, or subtract it from, the measured value determined in the preceding cycle, are then compared with predetermined limit values $y_1$, $y_2$, $y_3$ in comparators 22 to 27. $y_1>y_2>y_3$ applies in terms of magnitude. The comparison for the output signal of the differentiator and integrator 20, i.e. for the right rear wheel, is performed in comparators 22 to 24 and for the left rear wheel in comparators 25 to 27.

The evaluation of the output signals of the comparators 22 to 27 in valve actuation circuits 28, 29 commences as soon as a circuit 30 indicates an EBV function. The precondition for an EBV function is the existence of a vehicle deceleration signal ($-b_{FZ}$) and a brake slip signal.

If, upon the detection of the EBV function, the integrator content 20, 21 or its output signal x(t), i.e. $x_1$ or $x_2$, becomes greater in terms of magnitude than the limit value $y_2$, the result is that the braking pressure in the rear-wheel brake is maintained constant in the event of further increase of the braking pressure in the front-wheel brake. If the magnitude of the output signal $x_1$ exceeds the limit value $y_1$, and $y_1>y_2$ in terms of magnitude, this fact results in a reduction of the braking pressure in the respective rear-wheel brake. If, finally, the output signal $x_1$ of the wheel stabilized by the braking pressure reduction falls below the limit value $y_3$, a further increase of the braking pressure in the respective rear-wheel brake on command of pressure increase pulses is permitted.

Figure 3A:
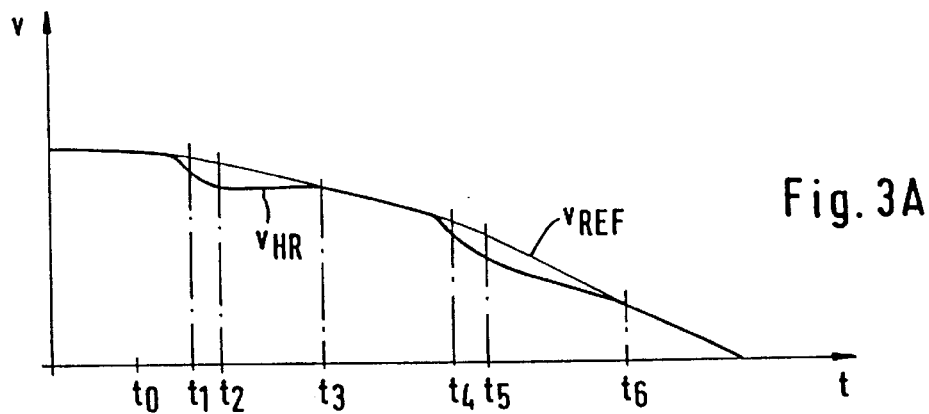
FIGS. 3A, 3B, 3C are waveform diagrams useful to explain the operation of the circuit arrangement of FIG. 2.
Figure 3B:
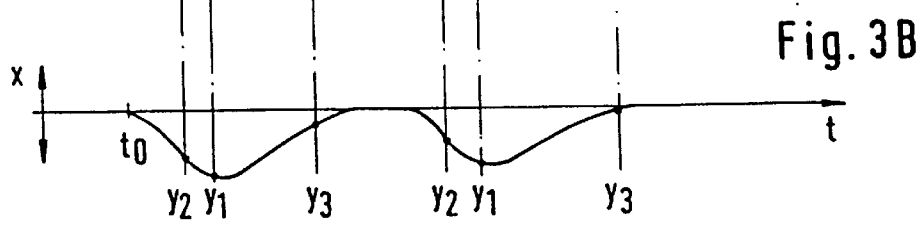
Figure 3C:
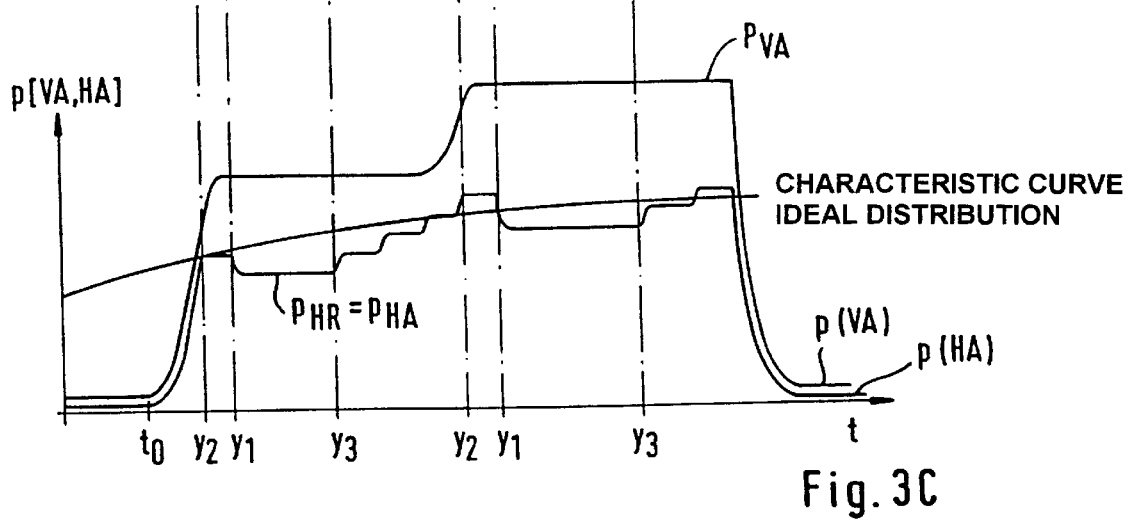

FIGS. 3A, 3B and 3C show waveform diagrams which illustrate the EBV function. Brake application commences at time $t_0$ in the situation to which FIGS. 3A to 3C relate. FIG. 3A illustrates the vehicle reference speed $v_{REF}$ which represents the vehicle speed in approximation, and the speed variation $v_{HR}$ of a rear wheel in this EBV situation. As is shown in FIG. 3B, the negative signal $x_1$ at the time $t_1$ exceeds the predetermined limit value $y_2$. At time $t_1$, the vehicle slows down and brake slip prevails so that circuit 30 identifies an EBV function. According to FIG. 3C, the result of exceeding the limit value $y_2$ is that the rear-axle braking pressure $p_{HR}$ is maintained constant. At time $t_2$, even the limit value $y_1$ is exceeded, and braking pressure reduction is thereby induced as shown by FIG. 3C. At time $t_3$, the limit value $y_3$ is reached so that a new pulsed pressure increase is permitted to commence in the brake of the right-rear wheel $p_{HR}$. Pressure maintenance in the rear wheel commences again at time $t_4$, succeeded by a pressure reduction at time $t_5$ and, finally, pressure re-increase at time $t_6$. Brake application is terminated at time $t_7$.

FIG. 3C, showing the braking pressure variation on the front axle $p_{VA}$ and the rear axle $p_{HA}$ in the illustrated example and the characteristic curve of the pressure variation in the event of ideal braking pressure distribution to the front and the rear axles, shows that the ideal distribution is approached sufficiently due to the EBV function.

The pressure variation $p_{HR}$ in the right rear wheel is identical with the pressure variation of the second rear wheel in the embodiment of FIG. 3C. This condition was reached by a select-low circuit 31 in FIG. 2 which ensures that the rear wheel having the lower braking pressure always leads the pressure variation $p_{HA}$ on the rear axle. Principally, however, an individual braking pressure control in the EBV mode is also possible in the wheel brakes of the rear-axle wheels by way of the circuit according to the present invention.

The output signals of the select-low circuit 31 of FIG. 2 are finally sent to the symbolically represented rear-wheel valves 32, 33 which determine the actual braking pressure variation in the rear-wheel brakes. One output of the circuit 31 is sufficient to actuate the inlet/outlet valves 32, 33 of both rear-wheel brakes in a pure select-low control. Separate outlets of the valve actuation circuit 31 are of course required in certain situations to control the rear-wheel braking pressure on each individual wheel, as has been shown.

The control of brake force distribution by way of the circuit arrangement according to the present invention on the basis of the difference between the vehicle deceleration and the rear-wheel deceleration is appropriately combined with the per se known slip-responsive control. Basically, priority is conceded to that type of control which permits the greater control accuracy and safety in response to the respective situation, i.e., as a function of a high or low coefficient of friction, homogeneous or different coefficient right/left, cornering or straight travel, etc.

We claim:

1. A circuit arrangement for a vehicle having front wheels, rear wheels, brakes associated with the front wheels and the rear wheels, and a brake system with adjustment of the brake force distribution to the brakes associated with the rear wheels, said circuit arrangement comprising:

electrically controllable hydraulic valves inserted in pressure fluid conduits leading to and from the front-wheel brakes and the rear-wheel brakes;

means for developing indications of the speed of the front wheels and the rear wheels of the vehicle in the form of front-wheel and rear-wheel speed signals; and valve control means responsive to the front-wheel speed indications and the rear-wheel speed indications:
   (A) for:
      (a) determining deceleration values of the rear wheels in the form of rear-wheel deceleration signals,
      (b) determining at least one of:
         (1) a deceleration value of the vehicle in the form of a vehicle deceleration signal, and
         (2) a reference quantity representative of the approximate deceleration value of the vehicle in the form of an approximate deceleration signal,
      (c) comparing the deceleration values of the rear wheels with at least one of:
         (1) the deceleration value of the vehicle, and
         (2) the reference quantity representative of the approximate deceleration value of the vehicle, to develop comparison output signals,
      (d) evaluating a discrepancy of the rear-wheel deceleration values from at least one of:
         (1) the vehicle deceleration value, and
         (2) the reference quantity representative of the approximate deceleration value of the vehicle, in the form of discrepancy signals,
      (e) generating, in response to a discrepancy evaluation, controls to actuate said electrically controllable hydraulic valves for control of brake force distribution, and
   (B) including:
      (a) first and second differentiating circuits to which a first of the rear-wheel speed signals and a second of the rear wheel speed signals, respectively, are supplied,
      (b) first and second low-pass filters to which output signals of said first and second differentiating circuits, respectively, are supplied, and
      (c) differentiator and integrator means for:
         (1) comparing output signals of said first and second low-pass filters, respectively, with at least one of:
            (i) the vehicle deceleration signal, and
            (ii) the approximate deceleration signal, and
         (2) developing the comparison output signals from which the control signals are developed to reduce, keep constant or increase further control of the braking pressure in the rear-wheel brakes as a function of the comparison output signals.

2. A circuit arrangement according to claim 1 wherein the comparison output signals of said differentiator and integrator means are developed according to the relation:

$$x(t)=\int(b'_R-b)dt.$$

where:
   $b'_R$ is the filtered deceleration signal of the right or left rear wheel, and
   $b_{FZ}$ is the vehicle deceleration or a reference quantity in approximation of the vehicle deceleration.

3. A circuit arrangement according to claim 2 further including means for comparing the comparison output signals of the differentiator and integrator means with first, second and third predetermined limit values, with said first predetermined limit value greater than said second predetermined limit value and said second predetermined limit value greater than said third predetermined limit value, and when:
   (a) the comparison output signals exceed the first predetermined limit value, the control signals cause the braking pressure in the rear-wheels brakes to be reduced,
   (b) the comparison output signals exceed the second predetermined limit value, the control signals cause the braking pressure in the rear-wheels brakes to be maintained constant, and
   (c) the comparison output signals exceed the third predetermined limit value, the control signals cause the braking pressure in the rear-wheels brakes to be increased further.

4. A circuit arrangement according to claim 3 wherein deceleration of the front wheels is the reference quantity representative of the approximate deceleration value of the vehicle.

5. A circuit arrangement according to claim 4 wherein the braking pressure in the rear-wheel brakes is controlled individually for each wheel.

6. A circuit arrangement according to claim 5 wherein the braking pressure in the rear-wheel brakes is controlled jointly according to the select-low principle and the braking pressure in the two rear-wheel brakes is dictated by the wheel having the lower braking pressure.

7. A circuit arrangement according to claim 6 further including means for determining the difference between the wheel slip of the rear wheels and the wheel slip of the front wheels as an additional control quantity for the brake force distribution.

* * * * *